United States Patent [19]
Menendez

[11] Patent Number: 4,694,961
[45] Date of Patent: Sep. 22, 1987

[54] FOOD CARRIER ASSEMBLY

[76] Inventor: Rita J. Menendez, 126 Montgomery La., Mingo Jct., Ohio 43938

[21] Appl. No.: 776,977

[22] Filed: Sep. 17, 1985

[51] Int. Cl.[4] ...................... B65D 21/02; B65D 25/28; B65J 1/34
[52] U.S. Cl. ...................................... 206/508; D7/19; D7/20; D7/76; 220/23.6; 220/94 R; 220/4 D; 294/144; 294/145; 294/172
[58] Field of Search .............. 206/508; 220/4 D, 23.4, 220/23.6, 23.8, 94 R, 23.2; D7/19, 20, 76; 294/144, 145, 172

[56] References Cited

U.S. PATENT DOCUMENTS

| | | | |
|---|---|---|---|
| D. 241,600 | 9/1976 | Ashton | D7/76 |
| 1,499,077 | 6/1924 | Pucaito | 220/4D |
| 1,680,220 | 8/1928 | Langel | 220/23.2 |
| 2,186,699 | 1/1940 | Jackson | 220/23.2 |
| 3,206,017 | 9/1965 | Williams | 220/23.4 |
| 3,501,044 | 3/1970 | Stone | 220/23.4 |
| 3,539,071 | 10/1970 | Ladder | 220/23.6 |
| 3,610,458 | 10/1971 | Nissley | 220/23.4 |
| 4,154,795 | 5/1979 | Thorne | 220/23.8 |

FOREIGN PATENT DOCUMENTS

| | | | |
|---|---|---|---|
| 633122 | 2/1962 | Italy | 220/23.6 |
| 1331742 | 9/1973 | United Kingdom | 220/23.6 |

Primary Examiner—George E. Lowrance
Attorney, Agent, or Firm—Neil F. Markva

[57] ABSTRACT

The food carrier assembly comprises a container for holding a food product with a structure for grasping the container to support the container while transporting the assembly. A handle mechanism is disposed on the grasping section for carrying the container as a compact carrier assembly for the good product. A specific feature of the invention has the container shaped as a pan to receive a plurality of cupcakes. A lid portion on the container has a structural configuration for stacking a second container on top of the lid portion to provide an upper and lower container. The handle structure includes a hand gripping portion with coupling members located at each end thereof for attaching to the grasping configuration on a plurality of stacked containers.

8 Claims, 8 Drawing Figures

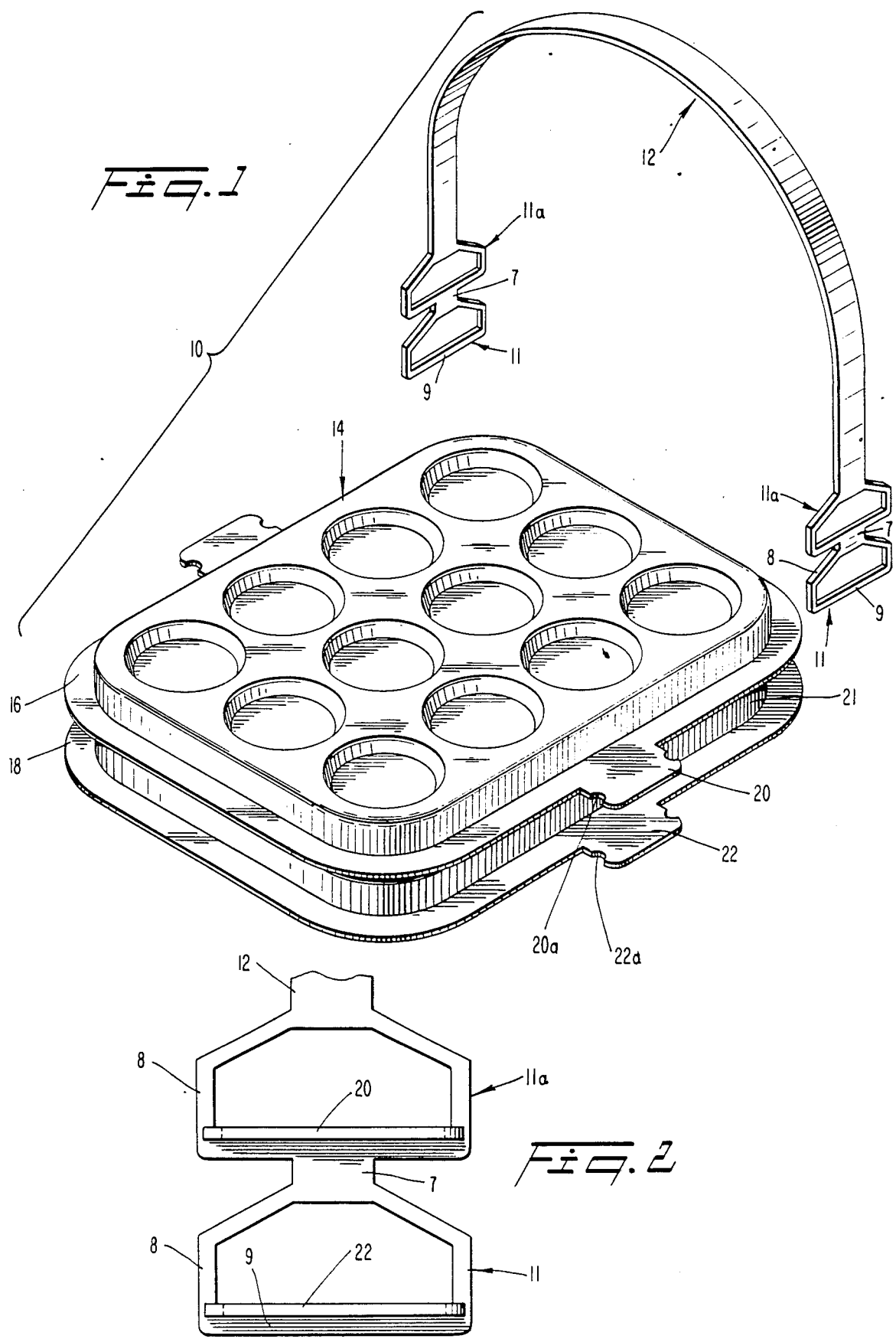

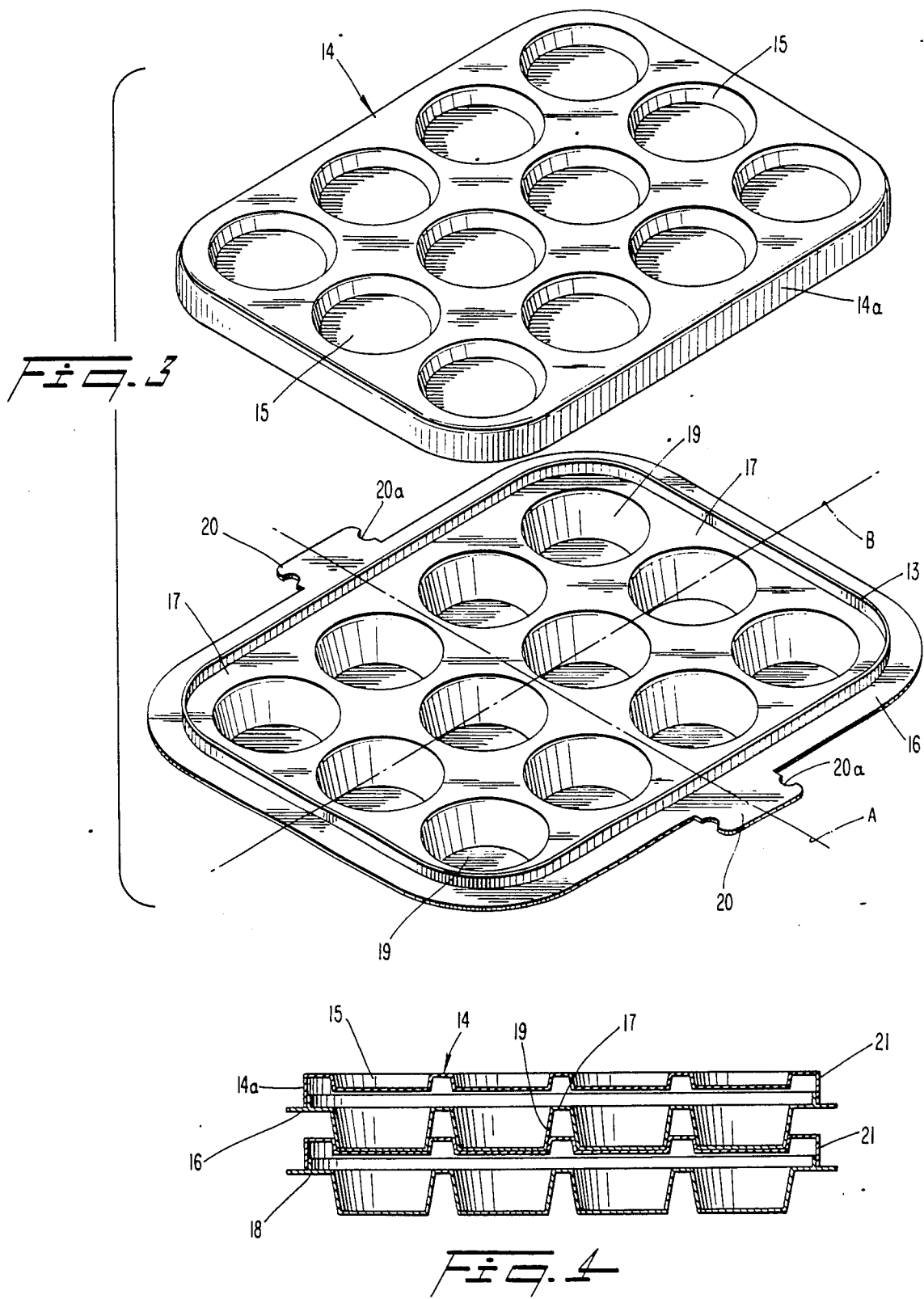

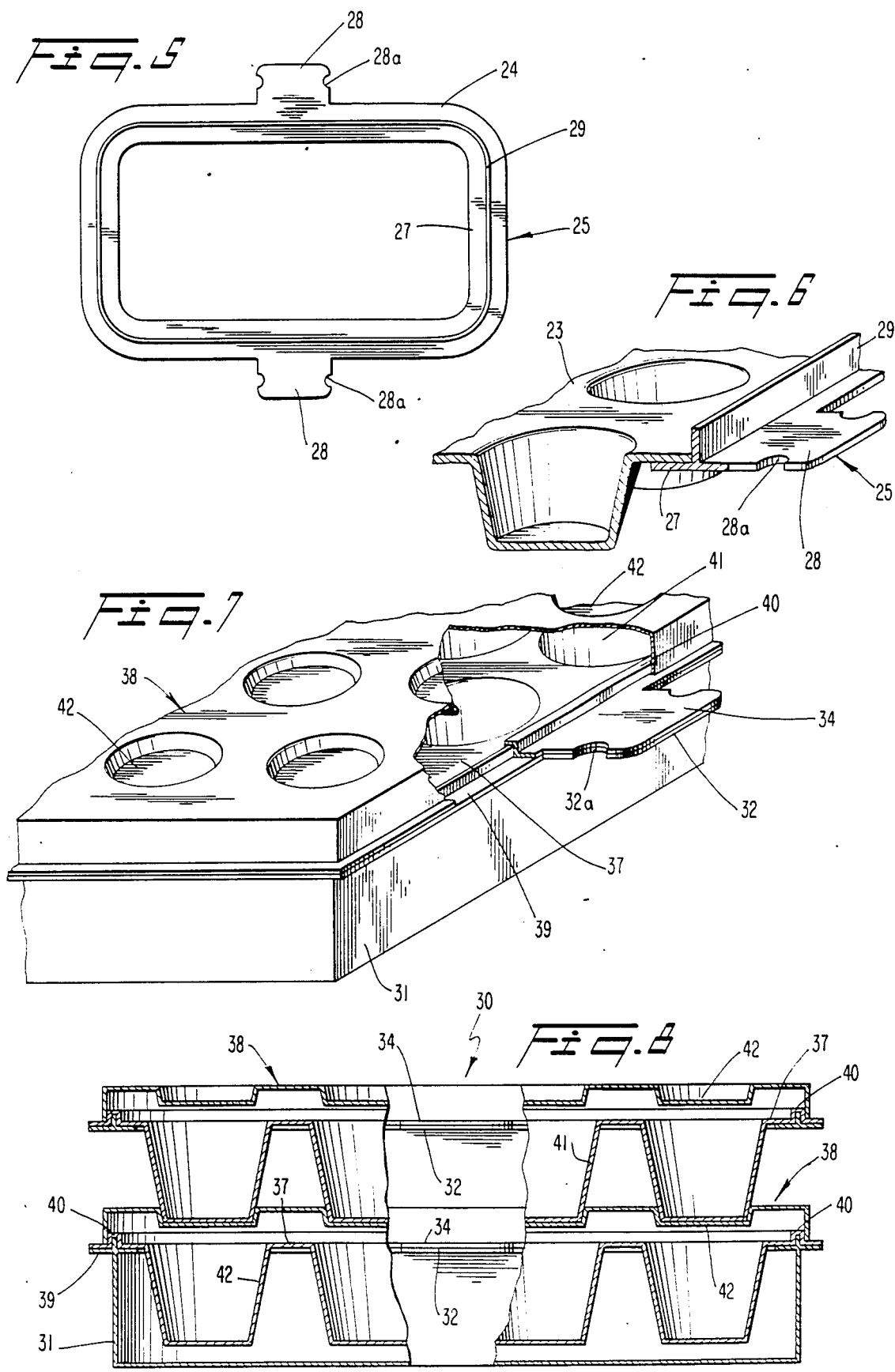

FOOD CARRIER ASSEMBLY

FIELD OF THE INVENTION

This invention relates to carrier assemblies particularly intended for transporting a plurality of containers holding a food product. More particularly, the invention is directed to a cupcake carrier assembly wherein either one or two dozen cupcakes may be transported from one place to another.

BACKGROUND OF THE INVENTION

There are many different types of food packages wherein there is a plurality of stackable containers. Examples of such food carrier assemblies are shown in the following patents.

| | | |
|---|---|---|
| 1,744,552 | 3,091,361 | 3,831,507 |
| 2,594,127 | 3,240,610 | 3,949,876 |
| 2,978,142 | 3,305,126 | 4,275,815 |

The stackable cake pans shown in U.S. Pat. No. 1,744,552 are used to contain cake batter during the baking process. The patentee states that the cake such as cupcakes may be cooled in the baking pan without removal. The particular assembly of cupcake pans is designed to allow circulation of air around the baking pan so that there is a cooling of the baked product. A series of upwardly extending posts located on each pan serve as spacing members so that there is a considerable distance from the edges of each set of pans. There is no provision in this particular assembly for using a handle member for transporting any one or a plurality of these cake pans from one location to another.

The U.S. Pat. No. 2,594,127 discloses stackable ice cube trays having lid portions. However, the patentee discloses no specific association of such stackable members to a handle configuration for transporting a plurality of the containers in an assembly.

The food package shown in U.S. Pat. No. 3,240,610 discloses stackable containers having lid members designed to effectuate the stacking function. The only mechanism for holding a plurality of stacked trays is shown in FIG. 14 with a surrounding band. This is significantly different from the particular type of cupcake carrier assembly disclosed and claimed herein.

The remaining patents cited herein show various forms of stackable container members having lid portions. However, one of the particular references discloses a mechanism by which a handle means is capable of holding and transporting either a single container or a plurality of stacked containers.

PURPOSE OF THE INVENTION

The primary object of this invention is to provide a cupcake carrier assembly wherein either a single dozen or two dozen cupcakes may be transported from one location to another using a very simple structural configuration associated with the cupcake pans.

Another purpose of the invention is to provide a carrier assembly which may be used with a standard baking pan or any food carrying device having a rim with an outer periphery adapted for being supported by a carrier device.

A further object of the invention is to provide a food carrier assembly which may be readily adapted to any type of food product when it is desired to carry that food product from one location to another location such as from home to school by children.

A further object of the invention is to provide a durable and simple device that may be used by children without the device coming apart during transportation using durable materials and structural configuration for holding the container or plurality of containers in place without disruption of the food product being transported.

A still further object of the invention is to provide a carrier assembly which may be used to transport cupcakes on some occasions and then on other occasions carry other baked products such as cakes or pies due to its adaptability to various types of pans.

SUMMARY OF THE INVENTION

The food carrier assembly of the invention comprises container means for holding a food product with means for grasping the container means to provide support for transporting the assembly. Handle means disposed on the grasping means is used to carry the container means as a compact carrier assembly for the food product.

In a specific embodiment of the carrier assembly, the container is shaped to receive a plurality of individual cupcakes. The grasping means is integrally formed in a one-piece configuration with the container means and includes a gripping portion disposed on a collar portion which extends along the outer rim of the container means. The handle means includes coupling means for detachably connecting to the gripping portion of the grasping means.

A feature of the invention is directed to the configuration of the gripping portion which includes tab means projecting outwardly from the opposing sides of the collar portion with the opposed tab means being in alignment with respect to each other. A single pair of tab means is disposed along a central axis of the container means. Each tab means comprises a single tab member having a breadth extending laterally outwardly from the central axis and in a direction parallel to a second central axis of the container means. The second central axis is perpendicular to the first central axis along which the pair of tab members extends.

A further feature of the invention is directed to the handle means which includes a hand gripping portion and coupling means located at each end of the hand gripping portion for attaching to the grasping means of a plurality of stacked container means. The container means includes a lid portion for covering a bottom portion which contains the food product. The lid or cover portion includes means for stacking a food holding container on top of the cover portion to provide an upper and lower food container in the carrier assembly. The coupling means includes a pair of stirrup means having a structural configuration to provide support under each tab means found on the grasping means. There are at least two stirrup means located at each end of the hand gripping portion to detachably connect to at least two pairs of tab members located on two stacked container means.

A further embodiment of a food carrier assembly according to the invention includes support means for receiving a container for holding a food product. The support means includes tray means having a cover portion which fits over an upstanding edge and covers the tray means. The tray may be used in combination with a baking pan designed to contain cupcakes or any other type of food product. The grasping means and the handle means for the tray means are designed as in the other embodiments.

A further embodiment of a food carrier assembly according to the invention includes a grasping means that is removably disposed around the outer periphery of a container such as a baking pan. The grasping means includes an outer rim having a gripping portion and is detachably mounted on the container. The collar portion of the grasping means includes an underlying rim supporting section and an upstanding ridge section to encompass the outer rim of the container. The gripping portion is shaped as a pair of tab members projecting outwardly from opposing sides of the collar portion in the fashion shown in the other embodiments disclosed herein.

BRIEF DESCRIPTION OF DRAWINGS

Other objects of this invention will appear in the following description and claims, reference being made to the accompanying drawings forming a part of the specification wherein like reference characters designate corresponding parts in the several views.

FIG. 1 is an exploded perspective view of a food carrier assembly made in accordance with this invention;

FIG. 2 is a fragmentary side elevational view showing the assembled carrying handle;

FIG. 3 is an exploded perspective view of a container and lid made in accordance with the invention;

FIG. 4 is a sectional view through a stack of containers as shown in FIG. 3;

FIG. 5 is a top plan view of a support member of a further embodiment made in accordance with this invention;

FIG. 6 is a fragmentary sectional view shown in perspective of the support member of FIG. 5 supporting a baking pan;

FIG. 7 is a fragmentary perspective view of a further embodiment of a food carrier assembly made in accordance with this invention; and FIG. 8 is a sectional view of the assembly as shown in FIG. 7.

DETAILED DESCRIPTION

A food carrier assembly, generally designated 10, includes two stacked pans having lids 21 and 14 and collars 18 and 16, respectively. Gripping tabs 22 and 20 are on respective bottom and top pans as shown in FIG. 1.

A handle assembly, generally designated 12, has two pairs of stirrup members 11 and 11a located at either end of a hand gripping portion of the handle 12. The bottom stirrups 11 are connected to the top stirrups 11a via a connecting strip 7. The stirrups 11 and 11a are spaced at either end of the hand gripping portion to fit over the gripping tab members 22 and 20, respectively, when the handle 12 is disposed on the assembly 10 as shown in FIG. 2.

Each of the stirrup members 11 and 11a include a pair of vertically disposed members 8 which fit into the indentations 20a and 22a on respective grasping tab members 20 and 22. The bottom support strip 9 is connected at either end to each of the vertical members 8 for each of the stirrups 11 and 11a and provides support across the breadth of the grasping tab members 20 and 22 as shown in FIG. 2.

The upper pan and lid combination as shown in FIG. 1 is shown in an exploded view in FIG. 3. The pan 17 has a pair of tab members 20 extending outwardly from opposing sides of the collar 16. The single pair of tab members are disposed along a central axis A and have a breadth extending outwardly from that central axis in a direction parallel to a second central axis B of pan 17 as shown. The central axis B is perpendicular to the central axis A along which the pair of tab members 20 extends.

In this embodiment, pan 17 is shaped to receive a plurality of cupcakes. The grasping means including collar 16 and tab members 20 are integrally formed in a one-piece configuration with container 17. The lid 14 includes indentations 15 for stacking a second container on top of the lid so that the assembly as shown in FIG. 10 has an upper and lower container. Handle 12 is designed so that the person using the food assembly may use either a single container or both containers depending on whether it is desired to transport either one dozen or two dozen cupcakes.

Pan 17 includes an upstanding ridge 13 over which the downwardly extending skirt 14a fits to position the lid 14 on top of pan 17. A cross sectional view of the stacked pan and lid combinations as shown in FIG. 1 shows the recesses 19 on pan 17 fitting into the upper recesses of the lid 21 disposed on the lower pan of assembly 10.

The embodiment of the invention shown in FIG. 5 and 6 is a rigid support ring 25 used to receive a container for holding a food product. Support ring 25 includes a rim portion having an upstanding edge 29, a collar portion 24, a pair of gripping tab members 28 and an underlying rim supporting section 27. As shown in FIG. 6, the supporting rim section 27 underlies the outer peripheral edge of the cupcake pan 23 as shown. In this embodiment, the ring structure 25 is composed of a material that is rigid enough to support an individual pan 23. Lids such as those shown in the early embodiment fit over the upstanding ridge section 29. The handle 12 fits into the indentations 28a in a fashion similar shown in FIG. 2 of the earlier embodiment. The upstanding ridge section 29 encompasses the outer rim of the container 23 as shown in FIG. 6.

In FIGS. 7 and 8, the food carrier assembly, generally designated 30, includes a tray 31 having an outer collar 39 and an upstanding edge 40. A pair of grasping tab members 32 extends outwardly along a central axis of the tray 31. The cupcake pan 37 having recesses 41 for receiving dough includes a pair of outwardly extending grasping tab members 34 which register over the outwardly extending tab members 32 of tray 31 as shown. The indentations 32a and 34a serve the same purpose as those on the earlier embodiment for receiving the vertically disposed members 8 of handle 12.

In this embodiment, the pan 37 is shaped along its edge to fit over the upstanding ridge 40 of tray 31. A lid 28 having shallow recesses 42 is disposed over the outer edge of pan 37. Lid 38 includes a pair of tab members 36 extending out of opposing sides of the lid 38 and registered with the tab members 32 and 34. Thus, the entire assembly of tray 31, pan 37, and lid 38 may be carried using handle 12 of the embodiment as shown in FIG. 1.

It is possible with the embodiments of FIGS. 5 and 6, and 7 and 8 to carry other types of containers for food products. It is also conceivable that the container 17 having recesses 19 as shown in FIG. 3 may be shaped to receive other types of food products such as pies and cakes. The outer rim structure may either be integrally formed with the container or designed to have a grasping ring or tray means which is removably disposed around the outer periphery of the pan being used for the food product.

The food carrier assemblies as shown herein are designed to stack at least two containers one on top of the other. In such an instance, there must be at least two stirrup means located at each end of a hand gripping portion on the handle 12. The stirrup means detachably connect to at least two pairs of tab members located on the two stacked container means.

While the food carrier assembly has been shown and described in detail, it is obvious that this invention is not to be considered as limited to the exact form disclosed, and that changes in detail and construction may be made therein within the scope of the invention without departing from the spirit thereof.

Having thus set forth and disclosed the nature of this invention, what is claimed is:

1. A food carrier assembly comprising:
   (a) a baking pan shaped to receive a plurality of cupcakes and having an outer rim and a lid portion,
   (b) a supporting ring member having an underlying rim supporting section below the outer rim to only provide support for transporting the baking pan, and
   (c) handle means disposed on the supporting ring member for carrying the baking pan as a compact carrier assembly,
   (d) the supporting ring member being removably disposed around the outer rim and including a gripping portion, and
   (e) the handle means includes a hand gripping portion and coupling means for detachably connecting to said gripping portion on the supporting ring member,
   (f) the gripping portion includes tab means projecting outwardly from opposing sides of the supporting ring member with the opposed tab means being in alignment with respect to each other.

2. A carrier assembly as defined in claim 1 wherein there is a plurality of cupcake pans including a first cupcake pan having a lid portion with means for stacking a second cupcake pan on top of the lid portion of the first cupcake pan to provide an upper and lower cupcake pan.

3. A carrier assembly as defined in claim 1 wherein the supporting ring member includes an upstanding ridge section to encompass the outer rim of the cupcake pan.

4. A carrier assembly as defined in claim 1 wherein there is a single pair of tab means disposed along a central axis of the baking pan.

5. A carrier assembly as defined in claim 4 wherein each tab means comprises a single tab member having a breadth extending laterally outwardly from said central axis of the baking pan,
the second central axis being perpendicular to said central axis along which the pair of tab members extends.

6. A carrier assembly as defined in claim 1 wherein the supporting ring member includes tab means projecting outwardly from opposing sides thereof with the opposed tab means being in alignment with respect to each other,
the coupling means includes means for detachably connecting to the tab means on the opposed sides of the cupcake baking pan.

7. A carrier assembly as defined in claim 6 wherein the tab means includes a pair of tab members extending outwardly from opposing sides of the cupcake baking pan, and
the coupling means includes a pair of stirrup means having a structural configuration to provide support under each of the tab members.

8. A carrier assembly as defined in claim 7 wherein there is a plurality of cupcake baking pans including a first cupcake baking pan having a lid portion with means for stacking a second cupcake baking pan on top of the lid portion of the first cupcake baking pan to provide an upper and lower cupcake baking pan, and
there are at least two stirrup means located at each end of the hand gripping portion to detachably connect to at least two parts of tab members located on the two stacked cupcake baking pans.

* * * * *